J. CLARRIDGE.
Seed-Planter.
No. 58,598.
Patented Oct. 9, 1866.
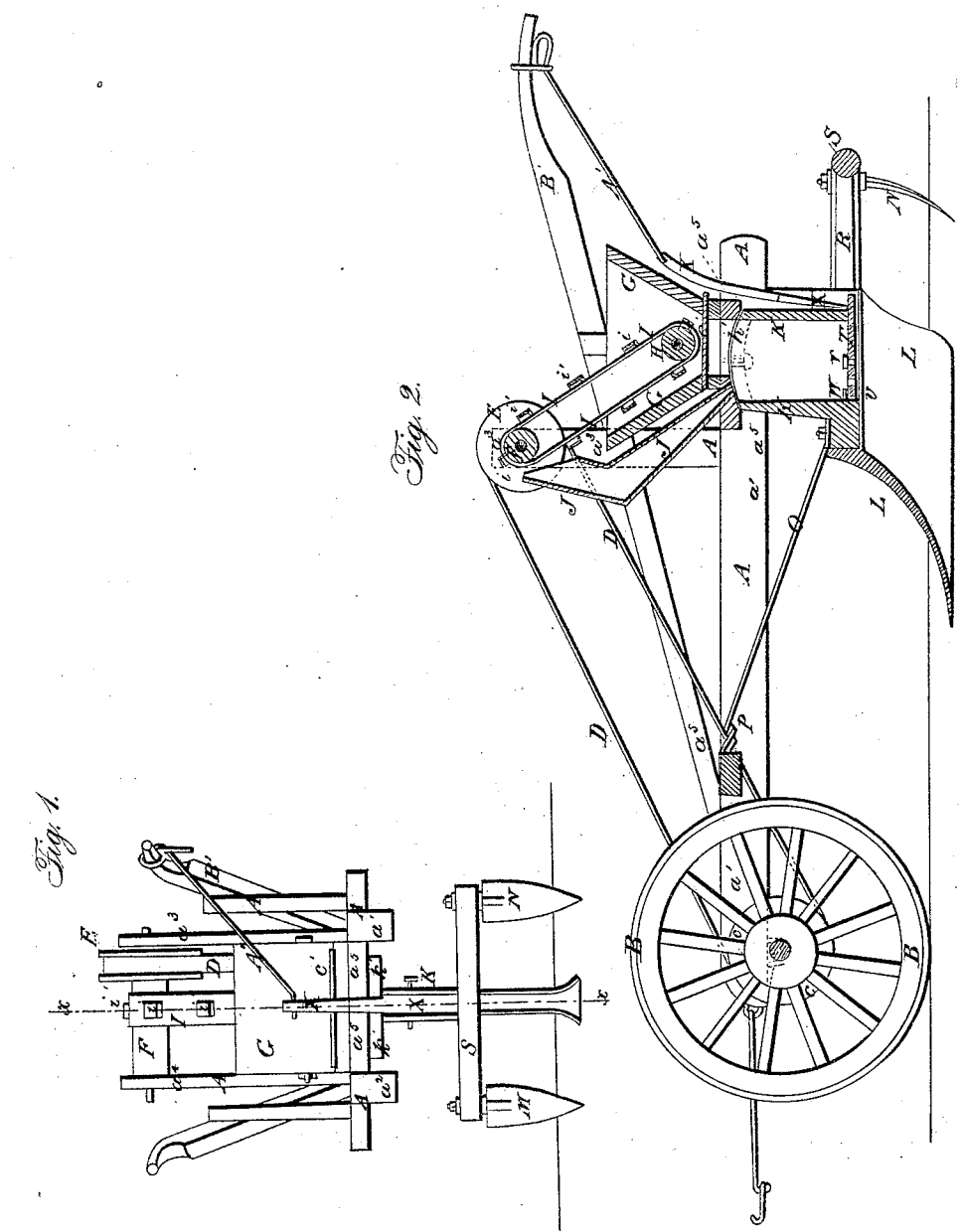
Witnesses:
Wm Dean Overell
Jas. A. Service
Inventor:
John Clarridge
Per Munn & Co
Attorneys

UNITED STATES PATENT OFFICE.

JOHN CLARRIDGE, OF PANCOASTBURG, OHIO.

IMPROVEMENT IN SINGLE-ROW CORN-PLANTERS.

Specification forming part of Letters Patent No. 58,598, dated October 9, 1866.

*To all whom it may concern:*

Be it known that I, JOHN CLARRIDGE, of Pancoastburg, in the county of Fayette and State of Ohio, have invented a new and useful Improvement in Combined Single-Row Corn Drill and Planter; and I do hereby declare that the following is a full, clear, and exact description thereof, which will enable others skilled in the art to make and use the same, reference being had to the accompanying drawings, forming part of this specification, in which—

Figure 1 is a rear end view of my improved corn drill and planter. Fig. 2 is a vertical longitudinal section of the same, taken through the line $x$ $x$, Fig. 1.

My invention has for its object to furnish an improved machine which may be used for planting corn in drills or hills, as may be desired; and it consists, first, in the combination and arrangement of the elevator, shafts, pulleys, band, drive-wheel, and spout with each other, with the hopper, and with the frame of the machine; second, in the combination of the slide-rod, lever, and valve with each other, with the hollow shank, and with the handle; and, third, in the combination of the concavo-convex shank-head with the concave bed-plate, the whole being constructed and arranged as hereinafter more fully described.

A is the frame of the machine, to the forward end of the pieces $a^1$ and $a^2$ of which the drive-wheel B is pivoted. To the axle of the wheel B is secured the pulley C.

D is a band, which passes around the pulley C and around the pulley E, which is secured to the shaft F.

The shaft F revolves in bearings in the upper ends of the uprights $a^3$ and $a^4$ of the frame A, as shown in Fig. 1, and is placed a little above the forward side of the hopper G.

H is a shaft, pivoted in the lower part of the hopper G, as shown in Figs. 1 and 2.

I is the elevator-belt, which passes around the shafts F and H, and which is provided with a series of cups, $i'$, which take the corn from the hopper G and deposit it in the spout J, through which it passes into the hollow shank K, and thence to the ground, where it is partially covered by the earth falling back after the passage of the plow L, the covering being completed by the narrow or bull-tongue shovel-plows M and N.

The head $k'$ of the hollow shank K is made convex on its upper and concave on its lower side, as shown in Fig. 2, and it is secured to the concave under side of the bed-plate $a^5$ by screw-bolts (one of which is shown in dotted lines in Fig. 2) passing through slots in the said head $k'$, so as to allow the shank K to be adjusted to regulate the pitch of the plow L without opening a space between the said head and bed-plate for the escape of the corn.

O is a rod extending from the lower end of hollow shank K, to which it is attached, to the plate P, attached to the cross-bar $a^6$ of the frame A, and hooking into one or the other of the holes formed in the said plate, according as it is desired that the plow should enter the ground more or less deep.

The plow L is securely attached to the lower end of the hollow shank K, and the shovel-plows M and N to the rear ends of arms R, projecting from the lower end of said shank K, the ends of said arms being connected by the strengthening-bar S.

T is a valve, working in grooves in the lower part of the hollow shank K, and having two holes formed through it, each of which should be of the right size to contain enough corn to form a hill. From these holes the corn is discharged to the ground through a single hole formed in the bottom plate, U, of the hollow shank K, as shown in Fig. 2.

V is a plate extending across the shank K, directly above the discharging-orifice, to prevent the corn from entering the holes in the valve T while the corn already in said holes is being discharged.

W is a plate extending across the shank K, at the forward end of the valve T, to prevent the corn from dropping down at the forward end of the said valve when drawn back and preventing its working.

The valve T is operated by a lever, X, pivoted in a vertical groove formed in the rear side of the hollow shank K, as shown in Fig. 2.

Upon the lower end of the lever X is formed a tenon, which enters a mortise formed in the rear end of the valve T, as shown in Fig. 2. To the upper end of the lever X is pivoted the end of the rod A', the rear end of which passes back to the handle B', and has two loops formed upon or attached to it, one of which loops passes over the end of the said handle B', and the other forms a handle, by means of which the said rod is operated.

C' is a sliding bottom, which is inserted in the bottom of the hopper G, as shown in Fig. 2. When the machine is used for drilling the sliding bottom C' is put into its place, and the valve T and its attachments removed, allowing the corn to fall freely from the spout J to the ground. When the machine is used as a planter the bottom C', shaft H, and elevator I are removed, allowing the hopper G and hollow shank K to become a continuous seed-reservoir, and the valve T and its attachments arranged as shown in the drawings. This allows the corn to be dropped in hills at any distance apart the operator may desire, the proper amount of corn for a hill being dropped each time the valve T is moved, either forward or backward.

Having thus described my invention, what I claim as new, and desire to secure by Letters Patent, is—

1. The combination and arrangement of the elevator I, shafts H and F, pulleys E and C, band D, drive-wheel B, and spout J with each other, with the hopper G, and with the frame A of the machine, substantially as herein described, and for the purpose set forth.

2. The combination of the valve T, lever X, and slide-rod A' with each other, with the hollow plow-shank K, and with the handle B', substantially as described, and for the purpose set forth.

3. The combination of the concavo-convex head $k'$ of the hollow shank K with the concave bed-plate $a^5$, substantially as herein described, and for the purpose set forth.

JOHN CLARRIDGE.

Witnesses:
WM. F. MCNAMARA,
JAMES T. GRAHAM.